United States Patent [19]
Vice et al.

[11] Patent Number: 5,893,336
[45] Date of Patent: Apr. 13, 1999

[54] LITTER BOX WITH SIFTER INSERT

[76] Inventors: David W. Vice; Anne N. Vice, both of 5401 DeMilo, Houston, Tex. 77092; Michael A. Poujol; Angela G. Poujol, both of 8733 Daffodil, Houston, Tex. 77063

[21] Appl. No.: 08/866,275

[22] Filed: May 30, 1997

[51] Int. Cl.[6] .................................................. A01K 1/035
[52] U.S. Cl. .................................................. 119/166
[58] Field of Search .................................. 119/166, 165, 119/167, 168, 170

[56] References Cited

U.S. PATENT DOCUMENTS

| | | | |
|---|---|---|---|
| 3,141,441 | 7/1964 | Russell | 119/166 |
| 3,752,120 | 8/1973 | Pallesi | 119/166 |
| 4,359,966 | 11/1982 | Casino | 119/166 |
| 4,802,442 | 2/1989 | Wilson | 119/166 |
| 4,817,560 | 4/1989 | Prince et al. | 119/166 |
| 5,353,743 | 10/1994 | Walton | 119/166 |
| 5,463,982 | 11/1995 | Murphy | 119/166 |
| 5,507,248 | 4/1996 | Gabbert | 119/166 |
| 5,515,812 | 5/1996 | Faust | 119/166 |
| 5,601,052 | 2/1997 | Rood et al. | 119/166 |
| 5,701,844 | 12/1997 | Murphy | 119/166 |

*Primary Examiner*—Michael J. Carone
*Assistant Examiner*—Yvonne R. Abbott
*Attorney, Agent, or Firm*—Kenneth A. Roddy

[57] ABSTRACT

A litter box having a sifter insert member that is used to remove solids and clumped matter from the litter material without removing or transferring the litter material. The sifter insert has a foraminous bottom wall, two opposed side walls, one rear end wall, and a transverse front edge extending across the front end of the foraminous bottom wall. The lower portion of the sifter insert is slidably nested in the litter box with its foraminous bottom wall resting on the bottom wall of the litter box. Litter material is sifted by lifting the sifter insert upwardly to capture a substantial portion of solid and clumped material. The sifter insert is reinserted beneath the litter material by holding it in a generally vertical position inwardly adjacent one end wall of the litter box and pushing its front edge downwardly to engage the bottom wall of the litter box and lowering the sifter insert while pushing its front edge along the bottom wall toward the opposed end wall of the litter box until the sifter insert is again nested in the litter box, and thereafter manipulating the litter box to evenly distribute the litter on the sifter insert foraminous bottom wall. The sifter insert may also be used to remove remaining solid and clumped materials by holding it at an angle, inserting its front edge into the litter material and pushing it through the litter material beneath the remaining solid and clumped materials and lifting them out of the litter material.

4 Claims, 7 Drawing Sheets

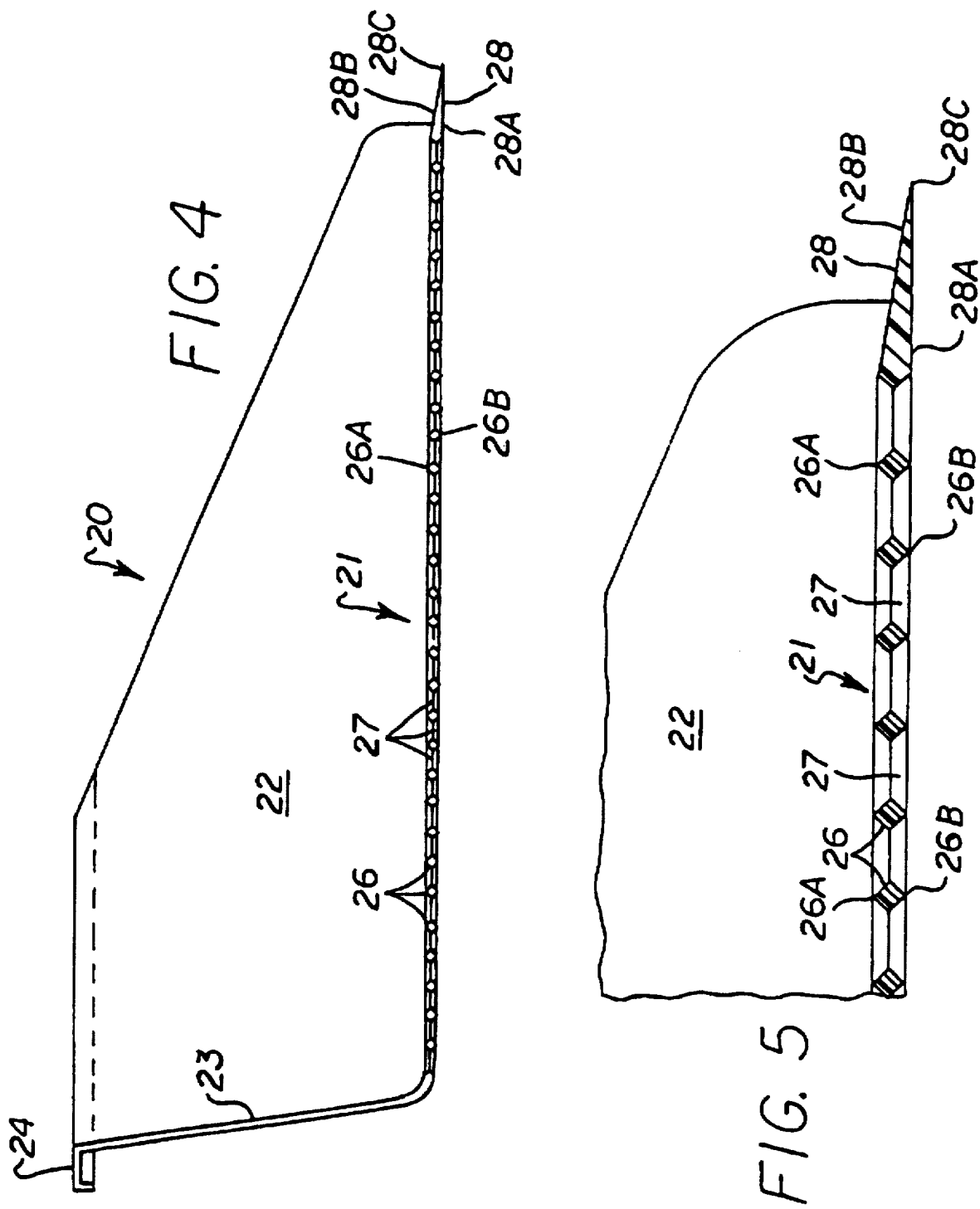

LITTER BOX WITH SIFTER INSERT

BACKGROUND OF THE INVENTION

1. Field of the Invention

This invention relates generally to litter boxes for pets, and more particularly to a litter box having a sifter insert with a foraminous bottom wall which is used to manually remove solids and clumped matter from the litter material without removing or transferring the litter material.

2. Brief Description of the Prior Art

Litter boxes which provide a relief station for cats and other small animals are well known in the art. The conventional litter box consists of a square or rectangular box having an open top end which is typically filled to a depth of one inch or more with granular material simulating fine gravel commonly referred to as "kitty litter". The kitty litter material is discarded and replaced as it becomes soiled. A "clumpable" kitty litter material has become widely accepted because it facilitates cleaning and reusing the litter material. When the "clumpable" litter material becomes soiled with urine or feces, the moisture is absorbed and forms clumps of soiled material which can be removed by lifting them out. However, when the urine or feces is near the bottom or side walls of the box, the clumpable type of material has a tendency to adhere the clumps to the bottom and side wall surfaces.

Others have proposed screen or tray sifting devices through which the litter material is passed or which fit into the litter box and are used to separate solid waste and clumps of soiled material from the litter material.

Vander Wall, U.S. Pat. No. 3,332,397 discloses an ordorless cat toilet comprising an open ended box receptacle having an upper and lower compartment separated by a grill-like wire partition. The litter is disposed in the upper compartment and a deodorizing substance is disposed in the lower compartment. The upper compartment receives the solid fecal matter and liquids and retains the solids and absorbs the bulk of the liquids allowing the excess liquids to drain into the lower compartment. A U-shaped wire guide rod is supported on the grill-like center partition and a wire frame sieve is passed through the litter in the upper compartment to remove the solids. The bottom of the sieve is supported on the U-shaped guide rod to assist in passing the sieve over the grill-like center partition.

Pallesi, U.S. Pat. No. 3,752,120 discloses a cat litter box consisting of three nesting containers, the uppermost having a screen bottom. The uppermost container is filled with sand after being nested over the other two containers. The solid matter is screened by lifting the uppermost container and permitting the sand to fall through the screen into the next lower container. After the refuse laying on the screen has been disposed of, the screen bottom container is nested onto the remaining empty container and the sand is poured into it from the storage container, which when empty is nested under the other containers to become the bottom container.

Larter, U.S. Pat. No. 4,325,325 discloses an arrangement utilizing two containers and a sifter or separator element wherein the first container, the separator, and the second container are stacked one on the other and the assembly is inverted to transfer the litter material from one container into the other while trapping the solids with the separator.

Burniski et al, U.S. Pat. No. 4,616,598 discloses a pet litter box wherein pet litter with accumulated dry solid waste material is held in a tray with a perforated bottom. A flat sheet with identical perforations is slidably engaged with the bottom of the preforated tray. By moving the perforated flat sheet to selectively block off all throughflow (closed mode) to complete congruence of the apertures permitting maximum throughflow (open mode), the user segregates waste matter from reusable litter within the litter box. Waste matter is then discarded and the tray put back into the closed mode and the litter box is turned over to resume operation.

Wilson, U.S. Pat. No. 4,802,442 discloses a cat litter screening device which includes two planar bottom panels of a mesh material that are pivoted together along a central axis and have mesh side panels and handles on each side. To clean the litter material the handle are pulled upwardly which causes the panels to move upwardly through the litter material while folding together to trap fecal matter which is then carried by the device for disposal.

Prince, U.S. Pat. No. 4,817,560 discloses a litter box with a basket-like sifter element that has a foraminous grid formed of intersecting bars of triangular cross section with the apex of the triangle pointing downwardly. The basket-like sifter element is forced downwardly through the litter material and, when it is desirable to remove the solids, the sifter element is lifted upwardly out of the litter box allowing the litter granules to fall back into the litter box while the solids are captured by the basket-like sifter element. This type of sifter construction requires pressing it downwardly and lifting it upwardly through the litter material which does not effectively remove clumps of soiled material that may be adhered to the bottom or side walls of the litter box. Pressing the sifter downwardly also has a tendency to mash the solids which may be beneath the sifter onto the bottom surface of the litter box.

The present invention is distinguished over the prior art in general, and these patents in particular, by a litter box having a sifter insert member that is used to remove solids and clumped matter from the litter material without removing or transferring the litter material. The sifter insert has a foraminous bottom wall, two opposed side walls, one rear end wall, and a transverse front edge extending across the front end of the foraminous bottom wall. The lower portion of the sifter insert is slidably nested in the litter box with its foraminous bottom wall resting on the bottom wall of the litter box. Litter material is sifted by lifting the sifter insert upwardly to capture a substantial portion of solid and clumped material. The sifter insert is reinserted beneath the litter material by holding it in a generally vertical position inwardly adjacent one end wall of the litter box and pushing its front edge downwardly to engage the bottom wall of the litter box and lowering the sifter insert while pushing its front edge along the bottom wall toward the opposed end wall of the litter box until the sifter insert is again nested in the litter box, and thereafter manipulating the litter box to evenly distribute the litter on the sifter insert foraminous bottom wall. The sifter insert may also be used to remove remaining solid and clumped materials by holding it at an angle, inserting its front edge into the litter material and pushing it through the litter material beneath the remaining solid and clumped materials and lifting them out of the litter material.

SUMMARY OF THE INVENTION

It is therefore an object of the present invention to provide a litter box having a sifter insert which removes solids and clumped matter from the litter material without requiring removal or transfer or the litter material.

It is another object of this invention to provide a litter box having a sifter insert which is slidably received and snugly nested in the litter box.

Another object of this invention is to provide a litter box having a sifter insert which removes substantial portions of solids and clumped matter from the litter material by lifting it upwardly through the litter material.

Another object of this invention is to provide a litter box having a sifter insert which is easily and quickly inserted beneath the litter material by sliding its front edge along the litter box bottom wall beneath the litter material.

Another object of this invention is to provide a litter box having a sifter insert which can be used to remove solid and clumped materials by holding it at an angle, inserting its front edge into the litter material and pushing it through the litter material beneath the solid and clumped materials, lifting them out of the litter material.

Another object of this invention is to provide a litter box having a sifter insert with a foraminous bottom wall with opposed V-shaped surfaces surrounding the openings, a downwardly sloping front edge, and solid walls on three sides which facilitates vertical upward and downward passage of the insert through litter material and prevents litter material from being lifted out of the litter box and spilled on the floor.

A further object of this invention is to provide a method for containing granular pet litter material and more effectively removing solids and clumped matter from the litter material.

A still further object of this invention is to provide a litter box having a sifter insert which is simple in construction and economical to manufacture.

Other objects of the invention will become apparent from time to time throughout the specification and claims as hereinafter related.

The above noted objects and other objects of the invention are accomplished by a litter box having a sifter insert member that is used to remove solids and clumped matter from the litter material without removing or transferring the litter material. The sifter insert has a foraminous bottom wall, two opposed side walls, one rear end wall, and a transverse front edge extending across the front end of the foraminous bottom wall. The lower portion of the sifter insert is slidably nested in the litter box with its foraminous bottom wall resting on the bottom wall of the litter box. Litter material is sifted by lifting the sifter insert upwardly to capture a substantial portion of solid and clumped material. The sifter insert is reinserted beneath the litter material by holding it in a generally vertical position inwardly adjacent one end wall of the litter box and pushing its front edge downwardly to engage the bottom wall of the litter box and lowering the sifter insert while pushing its front edge along the bottom wall toward the opposed end wall of the litter box until the sifter insert is again nested in the litter box, and thereafter manipulating the litter box to evenly distribute the litter on the sifter insert foraminous bottom wall. The sifter insert may also be used to remove remaining solid and clumped materials by holding it at an angle, inserting its front edge into the litter material and pushing it through the litter material beneath the remaining solid and clumped materials and lifting them out of the litter material.

BRIEF DESCRIPTION OF THE DRAWINGS

FIG. 4 is a longitudinal cross section through the sifter insert taken along line 4—4 of FIG. 3.

FIG. 5 is an enlarged cross section through the front edge of the sifter insert showing the shape of the ribs and leading edge of the bottom wall.

DESCRIPTION OF THE PREFERRED EMBODIMENT

Figure 1:
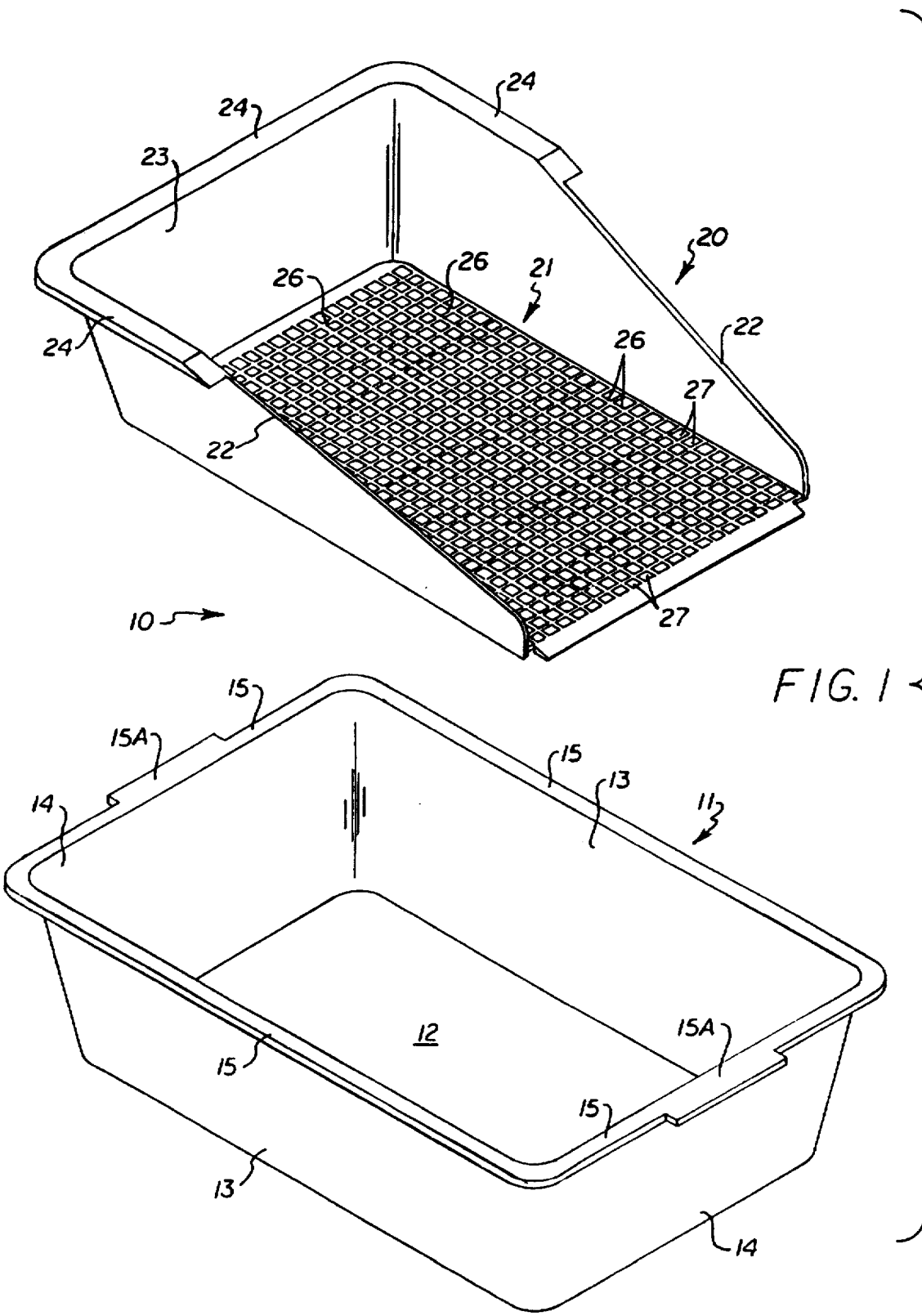
FIG. 1 is an exploded isometric view of the box member and sifter insert member of the litter box apparatus in accordance with the present invention.

Referring to the drawings by numerals of reference, there is shown in FIG. 1, a preferred litter box with sifter insert 10. The apparatus 10 includes a generally rectangular litter box member 11 and a removable sifter insert member 20 both formed of a suitable plastic material such as high density polyethylene.

Figure 2:
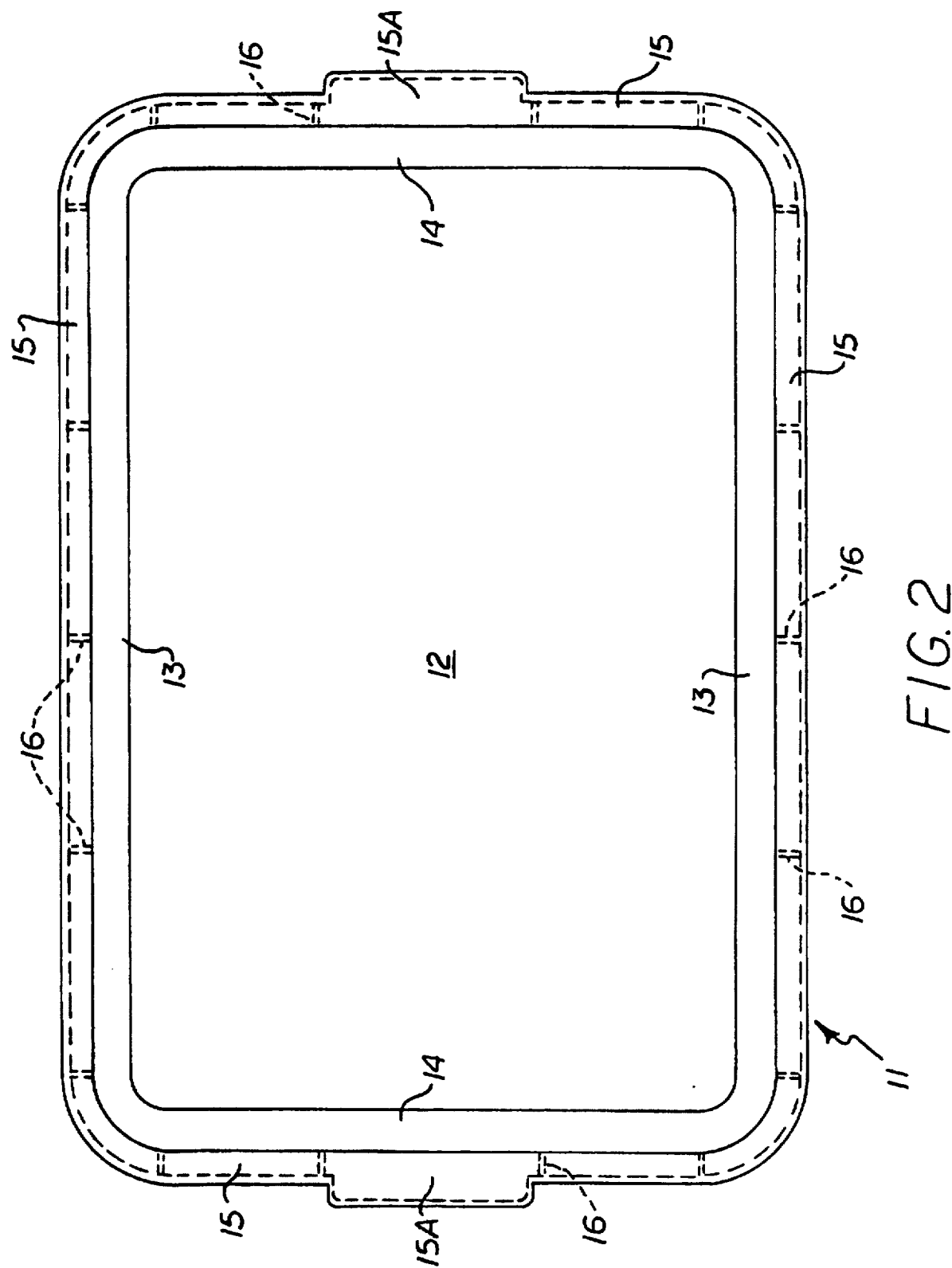
FIG. 2 is a top plan view of the box member.
Figure 3:
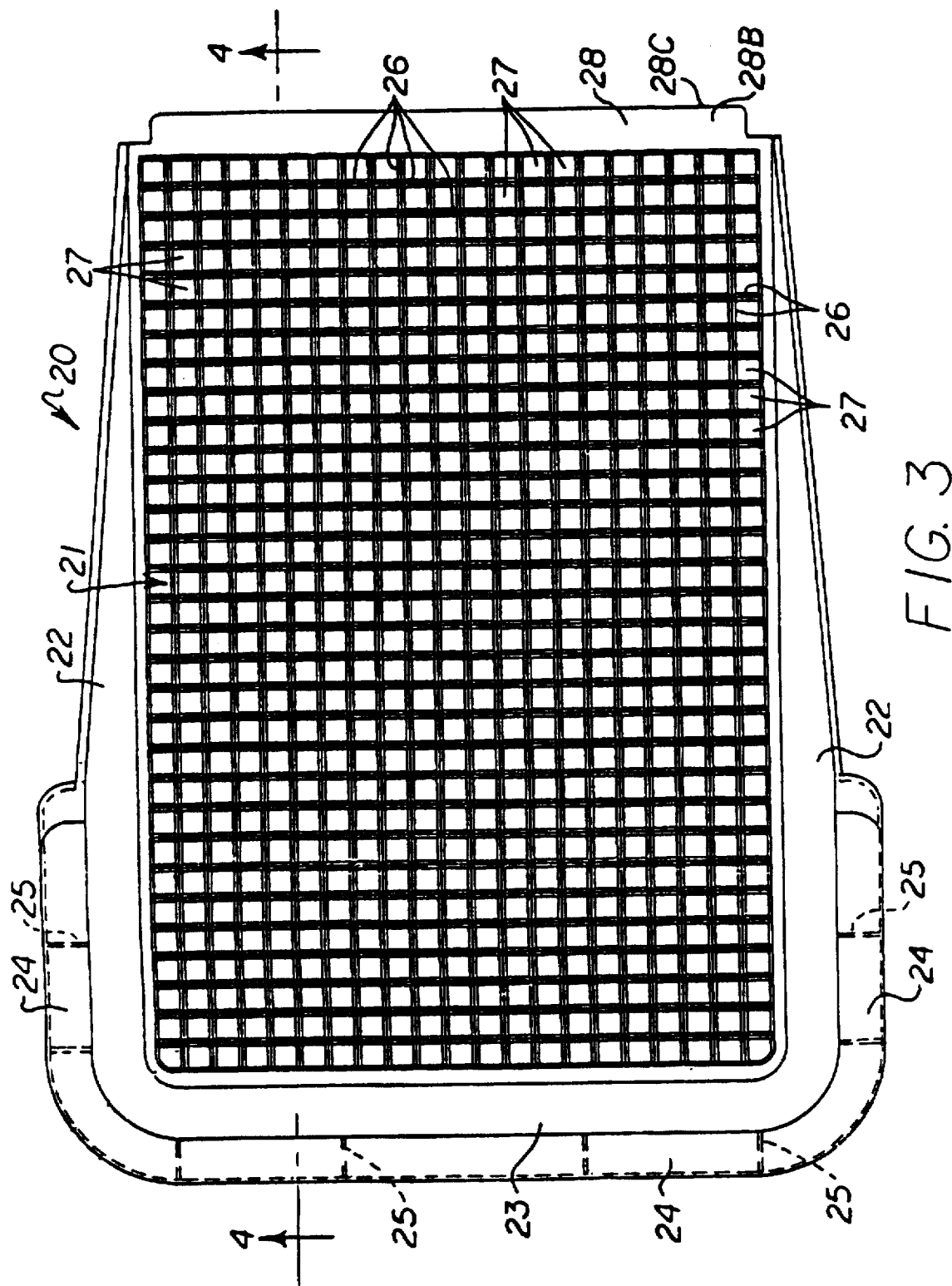
FIG. 3 is a top plan view of the sifter insert member.

The litter box member 11 has a flat bottom wall 12 with contiguous opposed side walls 13 and opposed end walls 14 extending upwardly therefrom. The walls 12, 13, and 14 are imperforate. The top edges of the side walls 13 and 14 extend horizontally outward a short distance and then terminate in a short depending vertical portion to form a radial flange or lip 15 surrounding the open top end of the box 11. A section of the radial flange or lip 15 at each end of the box member 11 extend further outward than the remaining portion to define handles 15A at each end. A series of rectangular gussets or webs 16 are formed on the underside of the lip 15 and handle portions 15A to reinforce and strengthen the radial flange or lip and handle portions (FIG. 2).

Referring now to FIGS. 1, 3, 4, and 5, the sifter insert 20 has a foraminous bottom wall 21 with contiguous opposed side walls 22 and one rear end wall 23 extending upwardly therefrom. The side walls 22 and rear end wall 23 are imperforate. The top edges of the side walls 22 extend horizontally a distance from each end of the top edge of the rear end wall 23 and then angularly downward to blend into the front portion of the bottom wall 21. The horizontal portion of the top edge of the side walls 22 and rear end wall 23 extend horizontally outward a short distance and then terminate in a short depending vertical portion to form a radial flange or lip 24 at the rear portion of the sifter insert member 20. A series of rectangular gussets or webs 25 are formed on the underside of the lip 24 to reinforce and strengthen the radial flange or lip.

As best seen in FIGS. 4 and 5, the foraminous bottom wall 21 of the sifter insert 20 is a grid configuration formed of a plurality of parallel spaced longitudinal and transverse intersecting ribs 26 which define a plurality of square openings 27. As seen in transverse cross section in FIG. 5, each of the ribs 26 has a diamond-shaped cross section with opposed V-shaped apexes 26A and 26B extending longitudinally along the top and bottom surfaces, respectively. The apexes of the diamond-shaped ribs 26 form upwardly and downwardly facing sharp edges surrounding each of the openings 27.

The front end 28 of the bottom wall 21 of the sifter insert 20 is a solid strip of material extending transversely between the lower ends of the side walls 22. As seen in transverse cross section, the bottom surface 28A of the front end 28 is flat and its top surface 28B tapers angularly downward to meet the flat bottom surface and forms a sharp leading edge 28C extending transversely across the bottom front end of the sifter insert 20 and a short distance forward of the side walls 22. The sharp leading edge 28C of the sifter insert 20 facilitates smooth and easy passage through and beneath the litter material. The leading edge 28C also dislodges any clumped material which may be adhered to the bottom wall 12 of the litter box 11.

Figure 6:
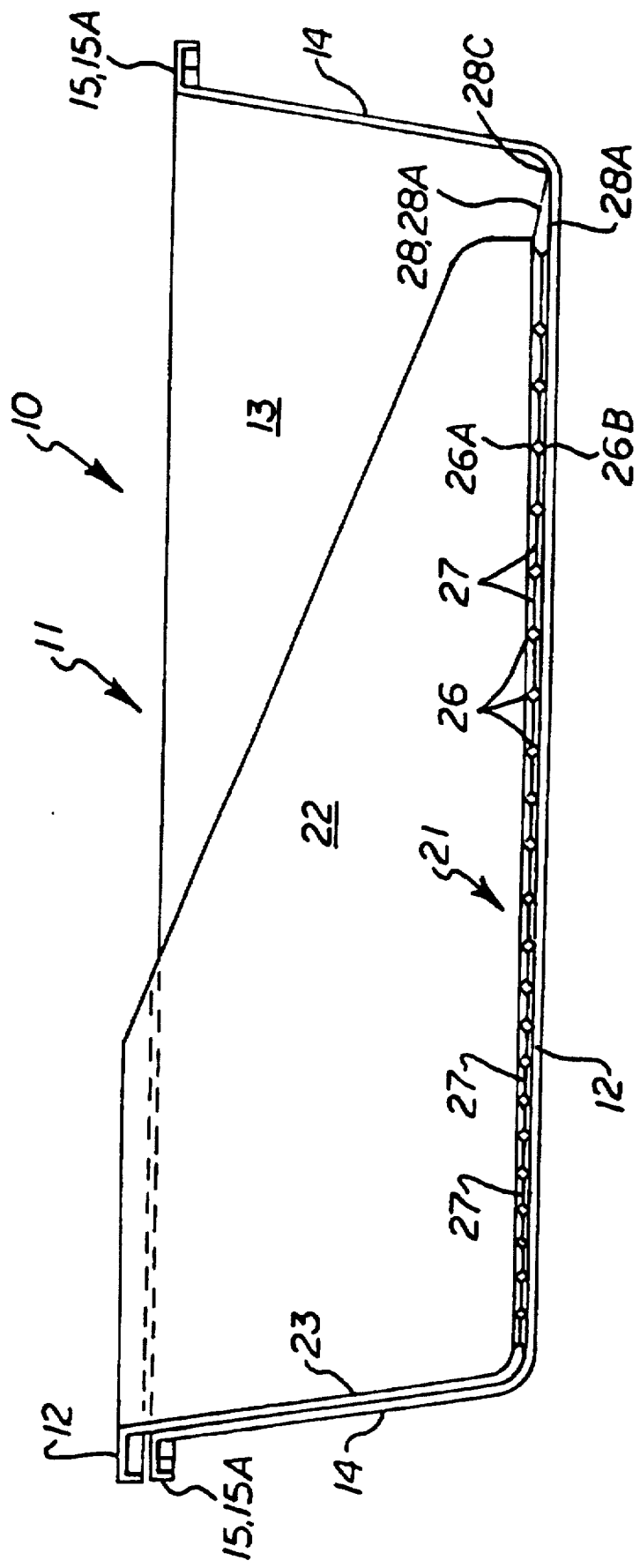
FIG. 6 is a longitudinal cross section through the nested box and sifter insert members.

As shown in FIG. 6, the sifter insert member 20 is sized and shaped to be received inside the box member 11 with the foraminous bottom wall 21 of the insert member supported on the bottom wall 12 of the box member by the downwardly facing apex 26B of the ribs 26 with the side walls 22 and rear wall 23 of the sifter insert spaced generally parallel with the side walls 13 and one end wall 14 of the box member and the flange or lip 24 of the sifter insert superposed above the flange or lip 15 of the box member.

It should be noted that, with the exception of the transverse strip along the front end 28, there are no flat surfaces on the foraminous bottom wall 21 of the insert 20. The opposed V-shaped apexes 26A and 26B of the ribs 26 facilitate vertical upward and downward passage of the insert 20 through the litter material. The sloping top surface 28B of the transverse strip at the front end 28 of the insert 20 allows litter material to slide off the top surface. These features prevent litter material from being lifted out of the box 11 and spilled on the floor. It should also be noted that the solid side walls 22 and rear wall 23 of the insert 20 prevent litter material from catching on the sides of the insert and being spilled as the insert is being lifted.

Operation

To use the litter box, the sifter insert 20 is placed into the box member 11 with its foraminous bottom wall 21 supported on the bottom wall 12 of the box member. In this position, the flange or lip 24 of the sifter insert 20 is superposed above the flange or lip 15 of the box member. The granular litter material is then poured into the nested insert 20 and box 11. A conventional "clumpable" type of litter material is recommended.

After the litter material has become soiled, with urine or feces, the clumps and solids can be easily and quickly removed by gripping the flange or lip 24 of the sifter insert 20 and lifting the sifter insert upwardly relative to the box member 11. The foraminous bottom wall 21 of the sifter insert passes easily through the litter material facilitated by the V-shaped apexes 26A of the ribs 26 surrounding the openings 27. The clumps and solids in the litter material are captured in the sifter insert 20 as it is pulled upwardly through the litter material and are disposed of.

If any clumps or solids remain, the sifter insert 20 may be used to comb through the litter material by inserting its leading edge 28C into the material and holding it at an angle while pushing it through the material. Clumps or solids which are smaller than the openings 27 can be removed by running the leading edge of the insert beneath them and lifting them out of the litter material.

Figure 7:
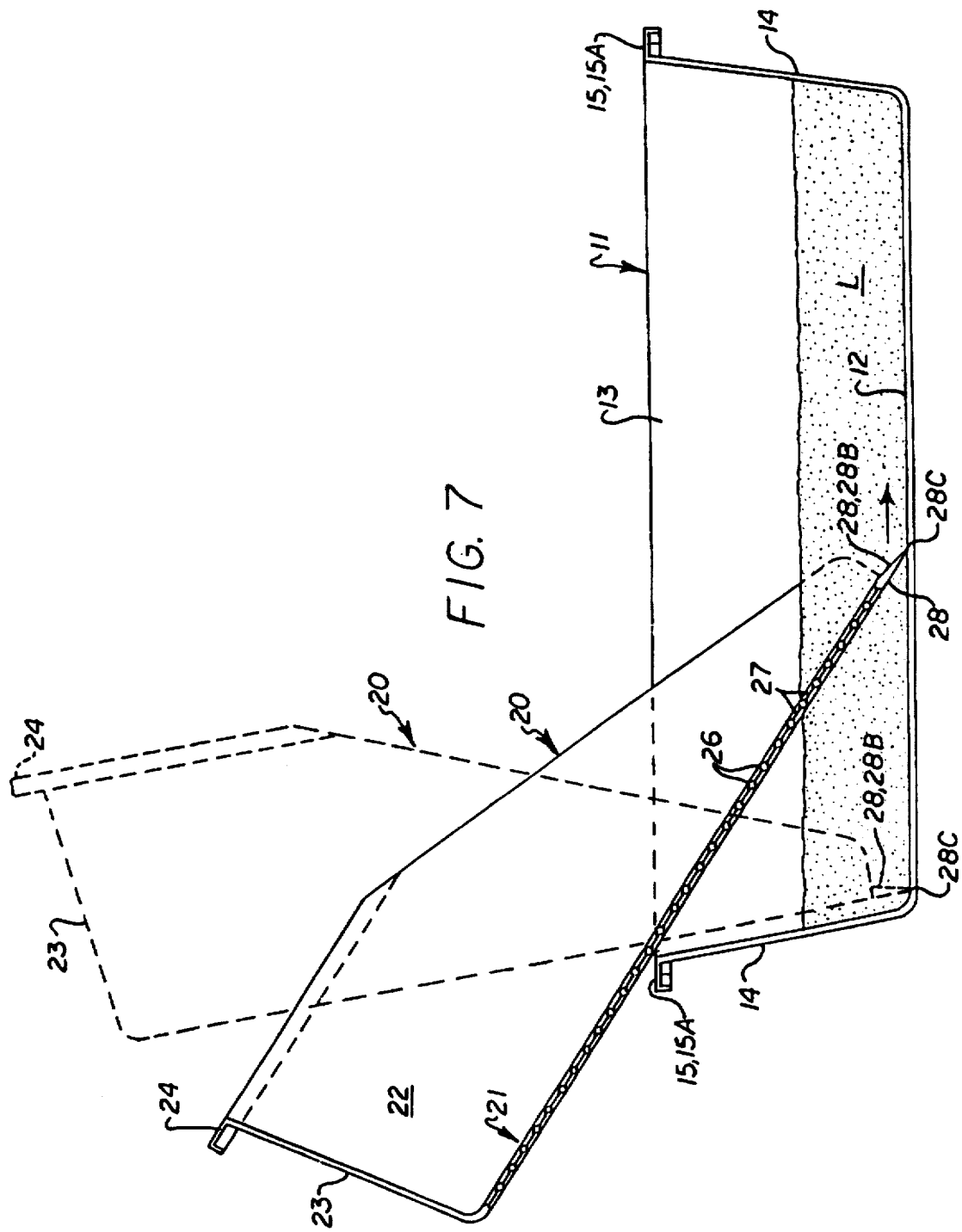
FIG. 7 is a longitudinal cross section through the litter box and insert members showing the insert member being reinserted into the litter box.

As shown in FIG. 7, after the clumps and solids have been removed, the sifter insert 20 may be reinstalled by holding it in a generally vertical position inwardly adjacent one end wall 14 of the box member 11 and pushing its leading edge 28C downwardly to engage the bottom wall 12 of the box and lowering the sifter insert rear wall 23 while pushing its leading edge along the bottom wall 12 beneath the litter material L toward the opposed end wall 14 of the box until the sifter insert is nested in the litter box. The forward end of the sifter insert 20 passes easily beneath the litter material facilitated by the sharp leading edge 28C extending transversely across the bottom front of the sifter insert. The leading edge 28C also dislodges any clumped material which may be adhered to the bottom wall 12 of the litter box 11.

When the leading edge 28C of the sifter insert 20 reaches the opposed end wall of the litter box 11, the sifter insert 20 is lowered to a horizontal position placing its flange or lip 24 on top of the flange or lip 15 of the box 11 and the and the litter insert is nested in the litter box as shown in FIG. 6. After the sifter insert is nested in the litter box 11, the box with the insert nested therein may then shaken or rocked back-and-forth so as to evenly distribute the litter material across the foraminous bottom wall 21 of the sifter insert 20. The process is repeated as required as the litter material becomes soiled.

Figure 8:
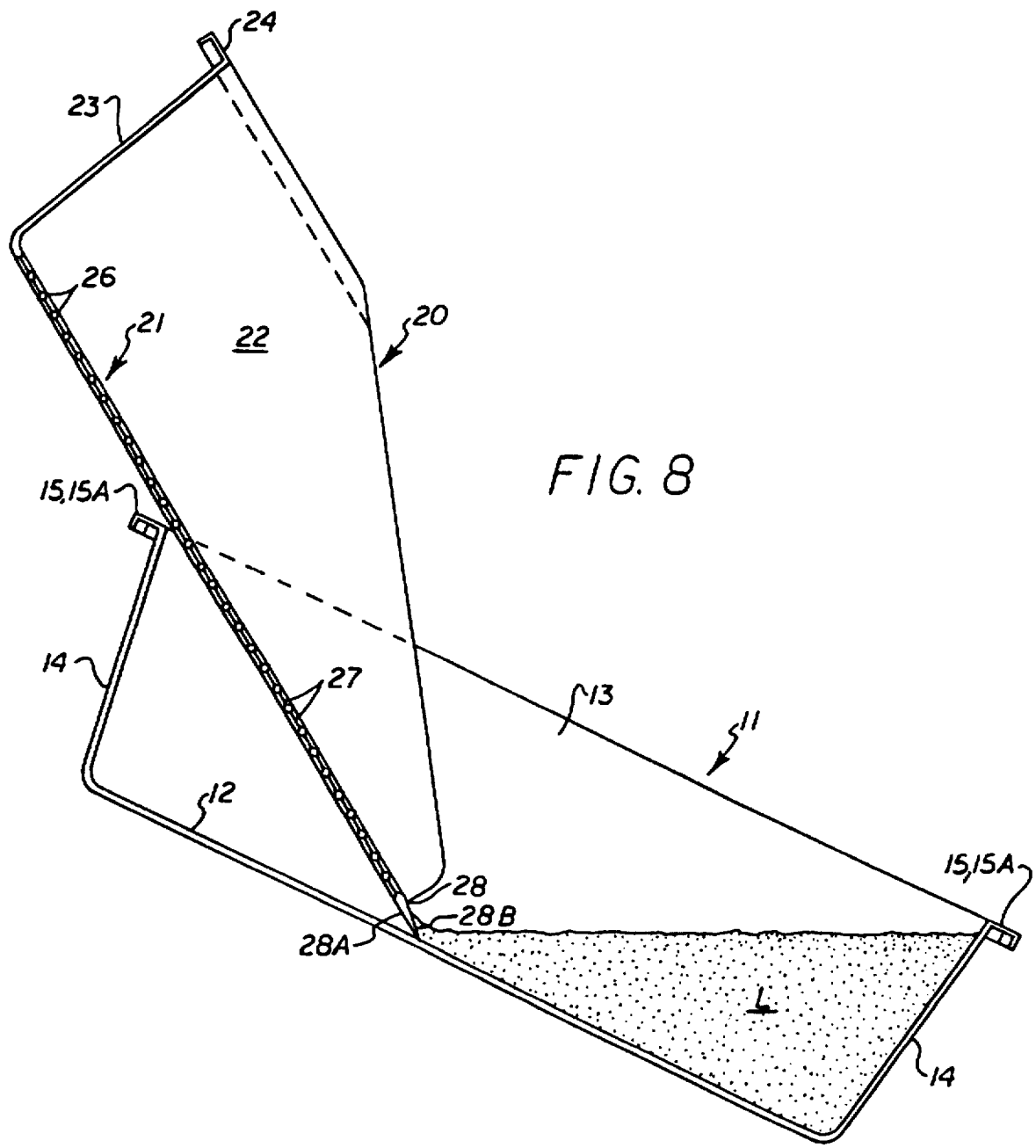
FIG. 8 is a longitudinal cross section through the litter box and insert members showing an alternate method of reinserting the insert member into the litter box.

Alternatively, as shown in FIG. 8, the sifter insert may be reinstalled by raising one end of the box member 11 so that the litter material L flows to the lower end of the box and congregates. The sifter insert 20 is then inserted into the box with the leading edge 28C sliding along the bottom wall 12 of the box, and is pushed beneath the litter material congregated at the lower end of the box. When the leading edge 28C of the sifter insert 20 reaches the end wall of the lower end of the raised box, the flange or lip 24 of the insert is placed on top of the flange or lip 15 of the box 11 and the raised end of the box is lowered to a horizontal position as shown in FIG. 6. When the box 11 is in the horizontal position, the box with the insert nested therein is then shaken or rocked back-and-forth so as to evenly distribute the litter material across the foraminous bottom wall 21 of the sifter insert 20.

While this invention has been described fully and completely with special emphasis upon a preferred embodiment, it should be understood that within the scope of the appended claims the invention may be practiced otherwise than as specifically described herein.

We claim:

1. A litter box with sifter insert comprising:

a container box for containing a quantity of granular litter material, said container box having a contiguous bottom wall, two opposed side walls, two opposed end walls, an open top end, and a radial flange surrounding said open top end that extends horizontally outward a short distance from said end walls and said side walls and terminates in a short depending vertical portion;

a sifter insert having a foraminous bottom wall, two contiguous imperforate opposed side walls, one imperforate rear end wall, and a thin imperforate generally rectangular leading edge extending transversely across a front end of said foraminous bottom wall between said two opposed side walls, said leading edge having a flat bottom surface and a top surface tapered angularly downward to join said bottom surface;

said foraminous bottom wall characterized as a grid formed of a plurality of parallel spaced longitudinal and transverse intersecting ribs defining a plurality of square openings, and each of said ribs being of diamond-shaped cross section with a longitudinally extending apex along its top and bottom surfaces to form upwardly and downwardly facing sharp edges surrounding each of said openings;

said sifter insert side walls having top edges which extend horizontally forward a distance from said rear end wall and then angularly downward and blend into said leading edge, and a contiguous rigid non-moving radial flange at the upper end of said rear end wall and said horizontally extending portion of said side walls that extends horizontally outward a short distance therefrom and terminates in a short depending vertical portion;

said sifter insert having a lower portion sized and shaped to be slidably and snugly received within said container box side walls and end walls with said foraminous bottom wall supported on said container box bottom wall in a generally horizontal position and said sifter insert radial flange superposed above said container box radial flange, and said thin leading edge sized and shaped to make substantial sliding contact with said container box bottom wall when slidably moved thereacross toward either of said container box end walls;

said sifter insert being capable of sifting said litter material by lifting it vertically upward allowing through passage of said litter material while occluding passage of a substantial portion of solid and clumped material, and capable of being reinserted beneath said litter material by pushing its said leading edge downwardly adjacent one end wall of said container box to engage said litter box bottom wall and sliding said leading edge along said container box bottom wall beneath said litter material toward the opposed end wall of said container box while simultaneously lowering its said rear end wall until said foraminous bottom wall is supported on said container box bottom wall in a generally horizontal nested position;

said diamond-shaped ribs and said upwardly facing sharp edges surrounding each of said openings preventing said litter material from being lifted out of said container box with said sifter insert when lifted vertically and facilitating smooth and easy passage of said foraminous bottom wall therethrough; and said diamond-shaped ribs and said downwardly facing sharp edges surrounding each of said openings facilitating smooth and easy passage through said litter material as said foraminous bottom wall moves generally horizontally and downwardly therethrough to assume said generally horizontal nested position.

2. A sifter insert for use in a litter box containing a quantity of granular litter material of the type having a bottom wall, two opposed side walls, two opposed end walls, and an open top end surrounded by a radial flange, the sifter insert comprising:

a sifter insert having a foraminous bottom wall, two contiguous imperforate opposed side walls, one imperforate rear end wall, and a thin imperforate generally rectangular leading edge extending transversely across a front end of said foraminous bottom wall between said two opposed side walls, said leading edge having a flat bottom surface and a top surface tapered angularly downward to join said bottom surface;

said foraminous bottom wall characterized as a grid formed of a plurality of parallel spaced longitudinal and transverse intersecting ribs defining a plurality of square openings, and each of said ribs being of substantially diamond-shaped cross section with a longitudinally extending apex along its top and bottom surfaces to form upwardly and downwardly facing sharp edges surrounding each of said openings;

said sifter insert side walls having top edges which extend horizontally forward a distance from said rear end wall and then angularly downward and blend into said leading edge, and a contiguous rigid non-moving radial flange at the upper end of said rear end wall and said horizontally extending portion of said side walls that extends horizontally outward a short distance therefrom and terminates in a short depending vertical portion;

said sifter insert having a lower portion sized and shaped to be slidably and snugly received within said litter box side walls and end walls with said foraminous bottom wall supported on said litter box bottom wall in a generally horizontal position and said sifter insert radial flange superposed above said container box radial flange, and said thin leading edge sized and shaped to make substantial sliding contact with said litter box bottom wall when slidably moved thereacross toward either of said litter box end walls;

said sifter insert being capable of sifting said litter material by lifting it vertically upward allowing through passage of said litter material while occluding passage of a substantial portion of solid and clumped material, and capable of being reinserted beneath said litter material by pushing its said leading edge downwardly adjacent one end wall of said litter box to engage said litter box bottom wall and sliding said leading edge along said litter box bottom wall beneath said litter material toward the opposed end wall of said litter box while simultaneously lowering its said rear end wall until said foraminous bottom wall is supported on said container box bottom wall in a generally horizontal nested position;

said diamond-shaped ribs and said upwardly facing sharp edges surrounding each of said openings preventing said litter material from being lifted out of said litter box with said sifter insert when lifted vertically and facilitating smooth and easy passage of said foraminous bottom wall therethrough; and said diamond-shaped ribs and said downwardly facing sharp edges surrounding each of said openings facilitating smooth and easy passage through said litter material as said foraminous bottom wall moves generally horizontally and downwardly therethrough to assume said generally horizontal nested position.

3. A method for containing granular pet litter material and removing solids and clumped matter from the litter material, comprising the steps of:

providing a container box having a bottom wall, two opposed side walls, two opposed end walls, and an open top end surrounded by a radial flange;

providing a sifter insert having a foraminous bottom wall, two contiguous imperforate opposed side walls, one imperforate rear end wall, a contiguous rigid non-moving radial flange extending horizontally outward a short distance from an upper end of said sifter rear end wall and side walls and terminating in a short depending vertical portion, a thin imperforate generally rectangular leading edge extending transversely across a front end of said foraminous bottom wall between said two opposed side walls, and having a lower portion sized and shaped to be slidably and snugly received within said container box side walls and end walls, said leading edge having a flat bottom surface and a top surface tapered angularly downward to join said bottom surface;

said foraminous bottom wall characterized as a grid formed of a plurality of parallel spaced longitudinal and transverse intersecting ribs defining a plurality of square openings, and each of said ribs being of substantially diamond-shaped cross section with a longitudinally extending apex along its top and bottom surfaces to form upwardly and downwardly facing sharp edges surrounding each of said openings;

nesting said sifter insert in said container box with its foraminous bottom wall supported horizontally on said container box bottom wall and said sifter insert radial flange superposed above said container box radial flange.;

placing a quantity of pet litter material into said container box to cover said sifter insert foraminous bottom wall;

manually gripping said sifter insert radial flange and lifting said sifter insert vertically upwardly through said litter material such that said diamond-shaped ribs and said upwardly facing sharp edges surrounding each of said openings pass through said litter material and prevent said litter material from being lifted therewith and capture a substantial portion of solid and clumped material on said foraminous bottom wall and thereafter disposing of said solid and clumped material; and manually gripping said sifter insert radial flange and positioning said sifter insert foraminous bottom wall in a generally vertical plane inwardly adjacent one end wall of said container box and pushing its said leading edge downwardly to engage said container box bottom wall and then lowering sifter insert rear wall while simultaneously pushing said leading edge along said bottom wall toward the opposed end wall of said container box such that said diamond-shaped ribs and said downwardly facing sharp edges surrounding each of said openings pass easily and smoothly through said litter material as said sifter insert foraminous bottom wall moves generally horizontally and downwardly therethrough to assume a generally horizontal nested position in said container box, and thereafter manipulating said container box to cause said litter material to become generally evenly distributed across said sifter insert foraminous bottom wall.

4. The method according to claim 3 including the further steps of after lifting said sifter insert vertically upwardly through said litter material to capture a substantial portion of solid and clumped materials on said foraminous bottom wall and disposing of said solid and clumped material, manually gripping said sifter insert radial flange and positioning said sifter insert foraminous bottom wall at an angle relative to said container box, inserting its said leading edge beneath the surface of said litter material and pushing it through said litter material beneath remaining solid and clumped materials, then lifting said sifter insert leading edge upwardly to capture said remaining solid and lumped materials and thereafter disposing of them.

* * * * *